United States Patent
Lee et al.

(10) Patent No.: US 12,230,778 B2
(45) Date of Patent: Feb. 18, 2025

(54) BATTERY MODULE

(71) Applicant: SK ON CO., LTD., Seoul (KR)

(72) Inventors: Eung Ho Lee, Daejeon (KR); Ho Yeon Kim, Daejeon (KR); Seung Dong Lee, Daejeon (KR); Hae Ryong Jeon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/457,095

(22) Filed: Aug. 28, 2023

(65) Prior Publication Data
US 2024/0178486 A1    May 30, 2024

(30) Foreign Application Priority Data
Nov. 25, 2022  (KR) .................. 10-2022-0160828

(51) Int. Cl.
| | |
|---|---|
| *H01M 10/658* | (2014.01) |
| *H01M 10/647* | (2014.01) |
| *H01M 50/211* | (2021.01) |
| *H01M 50/367* | (2021.01) |
| *H01M 50/507* | (2021.01) |

(52) U.S. Cl.
CPC ....... *H01M 10/658* (2015.04); *H01M 10/647* (2015.04); *H01M 50/211* (2021.01); *H01M 50/367* (2021.01); *H01M 50/507* (2021.01)

(58) Field of Classification Search
CPC ............. H01M 10/658; H01M 10/647; H01M 50/211; H01M 50/367; H01M 50/507
See application file for complete search history.

(56) References Cited

U.S. PATENT DOCUMENTS

| | | | |
|---|---|---|---|
| 2021/0320374 A1 | 10/2021 | Lee et al. | |
| 2023/0275300 A1* | 8/2023 | Kim ................ | H01M 50/291 |
| | | | 429/120 |
| 2023/0318132 A1* | 10/2023 | Jang ................ | H01M 10/625 |
| | | | 429/156 |

FOREIGN PATENT DOCUMENTS

| | | |
|---|---|---|
| EP | 4270592 A1 | 11/2023 |
| EP | 4300662 A2 | 1/2024 |
| KR | 10-2022-0029482 A | 3/2022 |
| KR | 10-2380225 B1 | 3/2022 |
| WO | 2022/182016 A1 | 9/2022 |

* cited by examiner

Primary Examiner — Lisa S Park
(74) Attorney, Agent, or Firm — Perkins Coie LLP

(57) ABSTRACT

A battery module includes a housing that includes an internal space, a cell stack accommodated in the internal space and including a plurality of battery cells stacked in a first direction and a plurality of thermal blocking members disposed between battery cells in the plurality of battery cells, a plurality of electrically conductive members electrically connected to the plurality of battery cells, and a frame supporting the plurality of electrically conductive members. Each battery cell includes an electrode assembly and an electrode accommodating portion accommodating the electrode assembly. At least one of the thermal blocking members includes: a body portion configured to face the electrode accommodating portion and blocking heat propagation between the plurality of battery cells, and one or more blocking portions extending from the body portion in a second direction perpendicular to the first direction, and configured to at least partially block gas flow in the first direction.

20 Claims, 11 Drawing Sheets

BATTERY MODULE

CROSS-REFERENCE TO RELATED APPLICATION

This patent document claims the priority and benefits of Korean Patent Application No. 10-2022-0160828 filed on Nov. 25, 2022, the disclosure of which is incorporated herein by reference in its entirety.

TECHNICAL FIELD

The technology and implementations disclosed in this patent document generally relate to a battery module.

BACKGROUND

Secondary batteries may be recharged and discharged repeatedly, and thus may be used in various devices and systems for supplying electrical power, such as digital cameras, mobile phones, laptop computers, hybrid vehicles, and electric vehicles. Examples of the secondary batteries include nickel-cadmium batteries, nickel-metal hydride batteries, nickel-hydrogen batteries, and lithium secondary batteries.

SUMMARY

The disclosed technology may be implemented in some embodiments to provide a battery module capable of inducing a high-temperature gas or flames occurring in a battery cell to flow along a preset path.

The disclosed technology may also be implemented in some embodiments to provide a battery module capable of blocking heat propagation between neighboring battery cells and preventing a high-temperature gas or flames from flowing in the vicinity of a cell stack.

The disclosed technology may also be implemented in some embodiments to provide a battery module capable of preventing an electrical short circuit from occurring between busbars in a thermal runaway situation.

In an aspect of the disclosed technology, a battery module includes: a housing structured to provide an enclosure with an internal space; a cell stack accommodated in the internal space of the housing and including a plurality of battery cells stacked in a first direction and a plurality of thermal blocking members disposed between battery cells in the plurality of battery cells; a plurality of electrically conductive members electrically connected to the plurality of battery cells of the cell stack; and a frame (e.g., busbar frame) coupled to and structured to support the plurality of electrically conductive members, wherein each of the plurality of battery cells of the cell stack includes an electrode assembly and an electrode accommodating portion accommodating the electrode assembly, wherein at least one of the plurality of thermal blocking members of the cell stack includes: a body portion disposed to face the electrode accommodating portion and configured to block heat propagation between the plurality of battery cells; and one or more blocking portions extending from the body portion in a second direction that is perpendicular to the first direction, the one or more blocking portions configured to at least partially block a gas flow in the first direction.

In some implementations, the blocking portion may include an end portion that is adjacent to the frame.

In some implementations, the plurality of thermal blocking members may include a material that includes at least one of mica, ceramic wool, or aerogel.

In some implementations, the one or more blocking portions may include: a first blocking portion formed on one side of the body portion and including at least a portion that is configured to be inserted into the frame; and a second blocking portion formed on another side opposite to the one side of the body portion.

In some implementations, at least a portion of the first blocking portion may be disposed between the plurality of electrically conductive members.

In some implementations, The first blocking portion may include: a first end portion facing an inner surface of the frame in the second direction; and a second end portion protruding further in the second direction than the plurality of electrically conductive members.

In some implementations, the frame may include an insertion recess into which the second end portion of the blocking portion is inserted.

In some implementations, the first blocking portion further may include a step portion connecting the first end portion to the second end portion.

In some implementations, the housing may include an upper case portion and a lower case portion configured to cover upper and lower portions of the cell stack, respectively, and the upper case portion may include a venting hole configured to allow gas to be discharged therethrough.

In some implementations, the battery module may further include a venting flow path formed in a space between the first end portion and the upper case portion.

In some implementations, the frame may include: a first frame disposed on one side of the cell stack; a second frame disposed on another side opposite to the one side of the cell stack; and a connection frame connecting the first frame to the second frame.

In some implementations, the plurality of thermal blocking members may include: a first thermal blocking member in which the first blocking portion is inserted into the first frame; and a second thermal blocking member in which the first blocking portion is inserted into the second frame.

In some implementations, the first thermal blocking member and the second thermal blocking member may be alternately disposed in the first direction.

In some implementations, An end portion of the second blocking portion of the first thermal blocking member may be adjacent to the second frame.

In some implementations, The battery module may further include: a third thermal blocking member disposed between the frame and the first end portion and extending in the first direction.

The battery module may further include: a fourth thermal blocking member facing the cell stack in a third direction perpendicular to both the first and second directions.

The third thermal blocking member and the fourth thermal blocking member may be integrally formed.

BRIEF DESCRIPTION OF DRAWINGS

Certain aspects, features and other advantages of the disclosed technology are illustrated by the following detailed description with reference to the accompanying drawings.

DETAILED DESCRIPTION

Example embodiments of the disclosed technology will now be described in detail with reference to the accompanying drawings.

A battery device, such as a battery module or a battery pack, may include a plurality of secondary battery cells that is stacked to form a cell stack and disposed inside a housing.

Various circumstances exist in which secondary batteries may be overheated and, in some instances, may become an ignition source, among others, for example, (1) a battery cell reaches the end of life, (2) a swelling phenomenon occurs in the battery cell due to decomposition battery materials including gases generated from such decomposition, (3) the battery cell is overcharged, (4) the battery cell is exposed to heat, (5) battery structure damages, e.g., when a sharp object, such as a nail, penetrates an outer casing material of the battery cell, or (6) an external impact is applied to the battery cell, the battery cell may cause ignition. Flames or a high-temperature gas spouted from the battery cell may cause a chain ignition of other adjacent battery cells accommodated in the battery device and may cause thermal runaway.

In such cases, flames, high-temperature gases, and conductive particles spouted from the battery cell freely flow inside a battery module and may directly ignite other adjacent battery cells or cause a short circuit between components of the battery module, resulting in further deterioration of the thermal runaway situation.

The disclosed technology can be implemented in some embodiments to provide a discharge structure that can discharge flames or high-temperature gases spouted from the battery cell that otherwise would have affected other battery cells. In addition, the disclosed technology can be implemented in some embodiments to provide a structure that can block the flow of flames or high-temperature gases inside the battery module and/or induce them to flow in a safe path.

Figure 1:
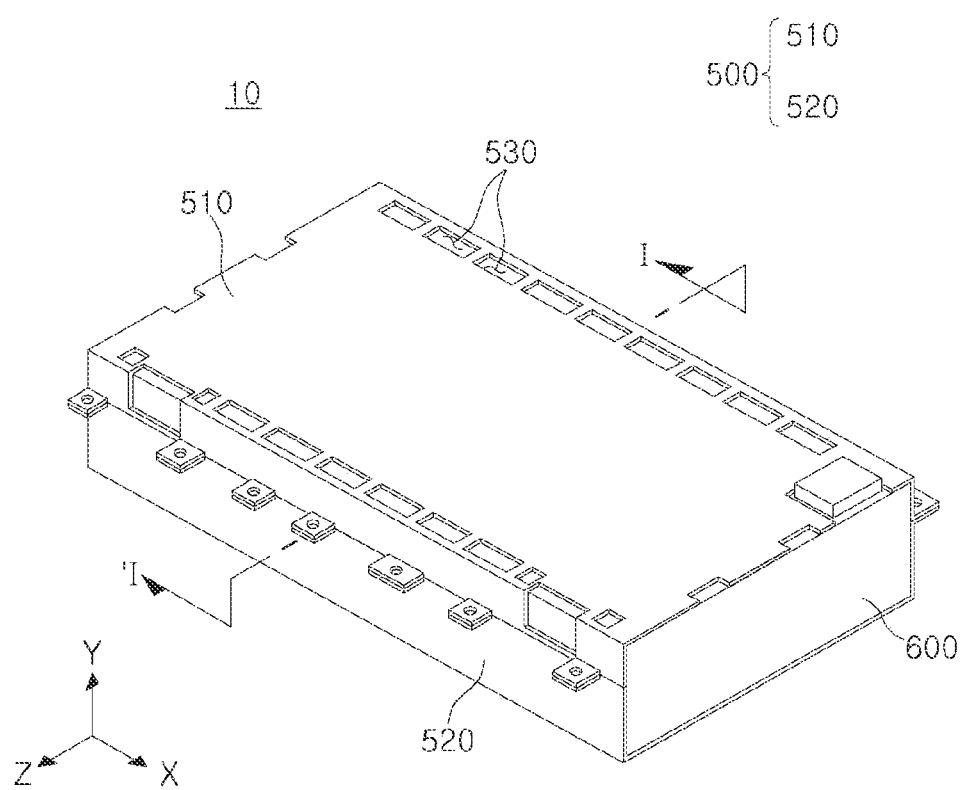
FIG. 1 is a perspective view of a battery module implemented based on some embodiments of the disclosed technology.
Figure 2:
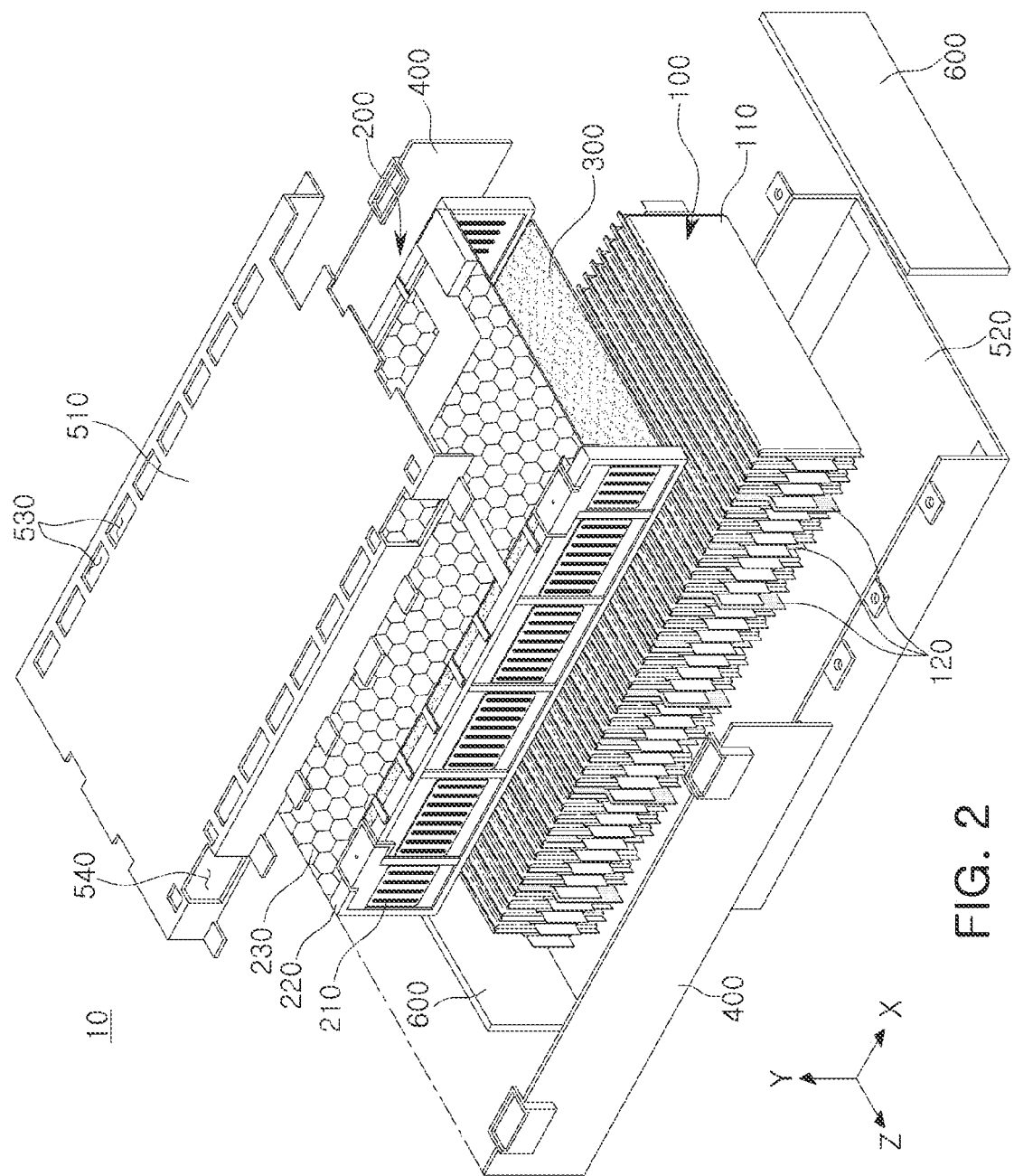
FIG. 2 is an exploded perspective view of a battery module implemented based on some embodiments of the disclosed technology.

FIG. 1 is a perspective view of the battery module 10 implemented based on some embodiments of the disclosed technology. FIG. 2 is an exploded perspective view of the battery module 10 implemented based on some embodiments of the disclosed technology.

The battery module 10 may include a housing 500 having an internal space, a plurality of battery cells 110 accommodated in the internal space, a busbar assembly 200 electrically connected to the battery cells 110, and an end cover 600 coupled to at least one side of the housing 500.

The plurality of battery cells 110 accommodated in the battery module 10 may be stacked in one direction (e.g., an X-axis direction of FIG. 2) to form at least a portion of the cell stack 100. In some implementations, a stacking direction of the battery cells 110 in which the battery cells 110 are stacked can be referred to as a first direction or a cell stacking direction.

Each battery cell 110 included in the cell stack 100 may output or store electrical energy. The plurality of battery cells 110 may be electrically connected to each other through the busbar assembly 200. At least a portion of the busbar assembly 200 may be disposed to face the cell stack 100 in a direction perpendicular to the cell stacking direction.

The busbar assembly 200 may include a plurality of electrical conductors or electrically conductive members 210 (referred to as busbars 210) for electrically connecting one battery cell 110 to another battery cell 110 and a busbar frame 220 supporting the plurality of busbars 210.

The busbar 210 may be formed of an electrically conductive material (e.g., a metal) and may serve to electrically connect the plurality of battery cells 110 to each other. The busbar 210 may be electrically connected to a lead tab 113 of the battery cell 110. For example, the busbar 210 may be bonded to the lead tab 113 of the battery cell 110. Various welding methods including laser welding may be applied to the connection between the busbar 210 and the lead tab (e.g., 113 of FIG. 4). However, the connection method is not limited to welding, and any connection method capable of electrically conducting two metallic materials may be used.

The busbar 210 may face the cell stack in a direction (e.g., a Z-axis direction) perpendicular to the first direction (an X-axis direction). In some implementations, a direction in which the busbar and the cell stack face each other can be defined as a second direction. In addition, a direction perpendicular to both the first direction and the second direction is defined as a third direction. For example, the third direction may be a height direction of the battery module and may be a direction in which an upper case portion and a lower case portion face each other.

The busbar assembly 200 may include a terminal portion electrically connected to an external circuit of the battery module 10. The terminal portion may be exposed to the outside of the battery module 10 through an opening 540 of the housing 500.

The busbar frame 220 may structurally support the busbar 210 and may maintain the stability of the busbar 210 even when there is an external shock or vibration. For example, the busbar frame 220 may include a plastic material that is lightweight and has excellent mechanical strength, such as polypropylene, polybutylene terephthalate, and modified polyphenylene oxide (MPPO). Therefore, the busbar frame 220 may structurally support the busbar 210, while securing insulation.

The busbar 210 may be fixed to the busbar frame 220 in various manners. For example, the busbar 210 may be fixed to the busbar frame 220 by a heat welding process or an insert injection process.

The busbar assembly 200 may further include a connection frame 230 disposed between the cell stack 100 and the housing 500 and connected to the busbar frame 220. For example, the busbar assembly 200 may include a pair of busbar frames 220 facing each other in the second direction with a cell stack interposed therebetween and a connection frame 230 connected to the pair of busbar frames 220 and facing the cell stack in the third direction.

In some implementations, a sensing module (not shown) capable of sensing a state of the cell stack 100 may be disposed in the connection frame 230. The sensing module (not shown) may include at least one of a temperature sensor or a voltage sensor. The sensing module (not shown) may sense or detect a state of the battery cell 110 and output sensed information to the outside of the battery module 10.

The housing 500 provides an internal space in which one or more cell stacks 100 may be accommodated. The housing 500 may be formed of a material having predetermined rigidity to protect the cell stack 100 and other electrical components accommodated in the internal space from external impact. For example, the housing 500 may include a metal material, such as aluminum.

The housing 500 may include a lower case portion 520 and an upper case portion 510 coupled to each other. However, a structure of the housing 500 is not limited thereto, and may have any shape as long as the structure has an internal space in which at least one cell stack 100 may be accommodated. For example, the housing 500 may be configured as an integral monoframe in which the upper case portion 510 and the lower case portion 520 are integrally formed and both sides are open.

The housing 500 may include a venting hole 530 through which a gas generated by the cell stack 100 is discharged. For example, the venting hole 530 may have a shape of a hole passing through the lower case portion 520 or the upper case portion 510.

A shielding member may be disposed in the venting hole 530. The shielding member may be formed of a thin film or sheet or material layer, and may block foreign matter from being introduced from the outside of the battery module 10. The shielding member may include a material that is lightweight and has excellent impact resistance, heat resistance, or electrical insulation. For example, the shielding member may include a polycarbonate sheet or layer. In the case of thermal runaway of the battery module 10, at least a portion of the shielding member may be torn so that a gas emitted from the cell stack 100 may pass therethrough properly.

The end cover 600 may be coupled to one open side of the housing 500. For example, as shown in FIG. 2, the end cover 600 may be provided as a pair and the pair of end covers 600 may be coupled to both open sides of the housing 500, respectively.

In order to prevent an electrical short circuit between the busbar assembly 200 and the housing 500, the battery module 10 may include an insulating cover 400. For example, the insulating cover 400 may be disposed to face the busbar assembly 200 between the busbar assembly 200 and the housing 500. The insulating cover 400 may include an insulating material, and thus may prevent electrical connection between the busbar assembly 200 and the housing 500. For example, the insulating cover 400 may be formed of a plastic injection molding material including polypropylene or modified polyphenylene oxide (MPPO). However, a material of the insulating cover 400 is not limited thereto. In some implementations, the insulating cover 400 may be used to prevent an electrical short circuit from occurring between the cell stack 100 and the housing 500 or between the busbar 210 and the housing 500.

In some implementations, a heat dissipation member (not shown) may be disposed between the cell stack 100 and the housing 500. In one example, the heat dissipation member may be disposed such that one surface thereof is in contact with the cell stack 100 and the other surface opposite to the one surface is in contact with the housing 500. In some implementations, the heat dissipation member may be provided as a thermal adhesive. In some implementations, the heat dissipation member may fill a space between the cell stack 100 and the housing 500 so that heat transfer by conduction may be more actively performed. Accordingly, heat dissipation efficiency of the battery module 10 may be increased.

When a large number of battery cells 110 are stacked inside an enclosure of the battery module 10, there may be a risk that an undesirable event or situation occurring in one battery cell 110 that may affect another battery cell in the battery module 10. In addition, high-temperature gas or flames occurring in the battery cells 110 may irregularly flow around the cell stack 100 and apply impact on the battery module 10. Alternatively, a short circuit may occur between components inside the battery module 10 (e.g., between a plurality of busbars) due to conductive particles scattered together with gas or flame. In addition, while gas or flames flows in a portion adjacent to the cell stack 100, an unintended heat propagation path may be formed, which may further aggravate a thermal runaway situation.

To prevent this, the battery module 10 may include a plurality of thermal blocking members 120. For example, the cell stack 100 may include the thermal blocking member 120 disposed between the battery cells 110. Each thermal blocking member 120 may include one or more thermal insulating materials with low thermal conductivity to provide the thermal blocking function, such as preventing or significantly reduce the undesired heat propagation between neighboring battery cells 110. The thermal blocking member 120 may serve to protect the battery cell 110 from physical and thermal shock. For example, the thermal blocking member 120 may be configured to block heat propagation from one battery cell 110 to another battery cell 110, while absorbing expansion pressure of the battery cell 110. In some implementations, for example, a thermal blocking member 120 may include mica, silicate, graphite, alumina, ceramic wool, super wool, or aerogel.

The battery module 10 may further include an upper thermal blocking member 300 facing at least one side of the cell stack 100. For example, the upper thermal blocking member 300 may be disposed to face the cell stack 100 between the cell stack 100 and the upper case portion 510. The upper thermal blocking member 300 may cover an upper side of the cell stack 100 to prevent an occurrence of an unexpected heat propagation path between the cell stack 100 and the housing 500.

The plurality of thermal blocking members 120 and the upper thermal blocking member 300 may provide a path for gas or flames around the cell stack 100 to move in a preset direction in a thermal runaway situation. For example, the thermal blocking member 120 disposed between the battery cells 110 may guide gas or flames toward the top of the battery module 10.

Hereinafter, characteristics of the thermal blocking member 120 included in the battery module 10 will be described in detail with reference to FIGS. 3 to 6.

Figure 3:
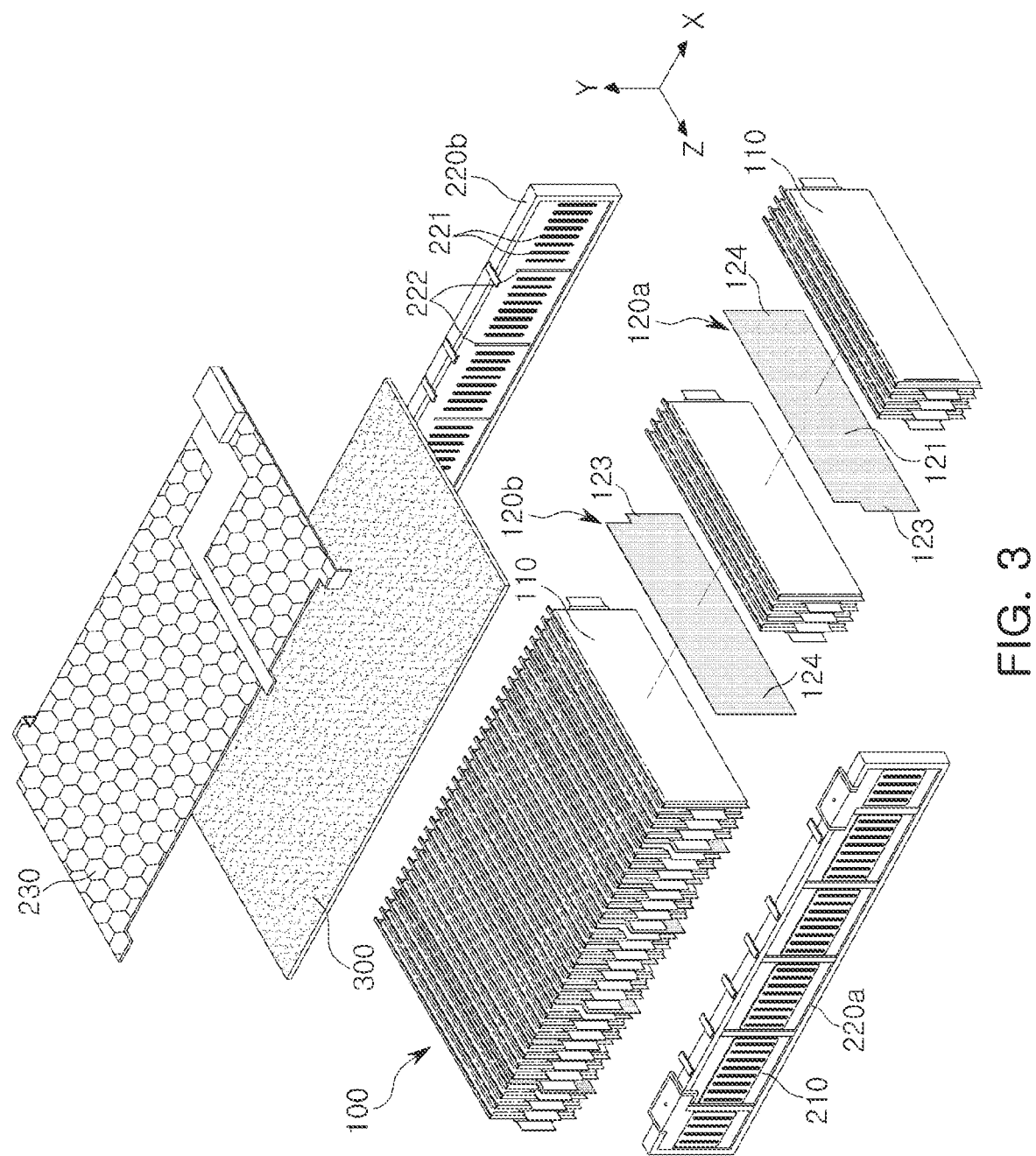
FIG. 3 illustrates an arrangement of a battery cell, a thermal blocking member, and a busbar assembly based on some embodiments of the disclosed technology.
Figure 4:
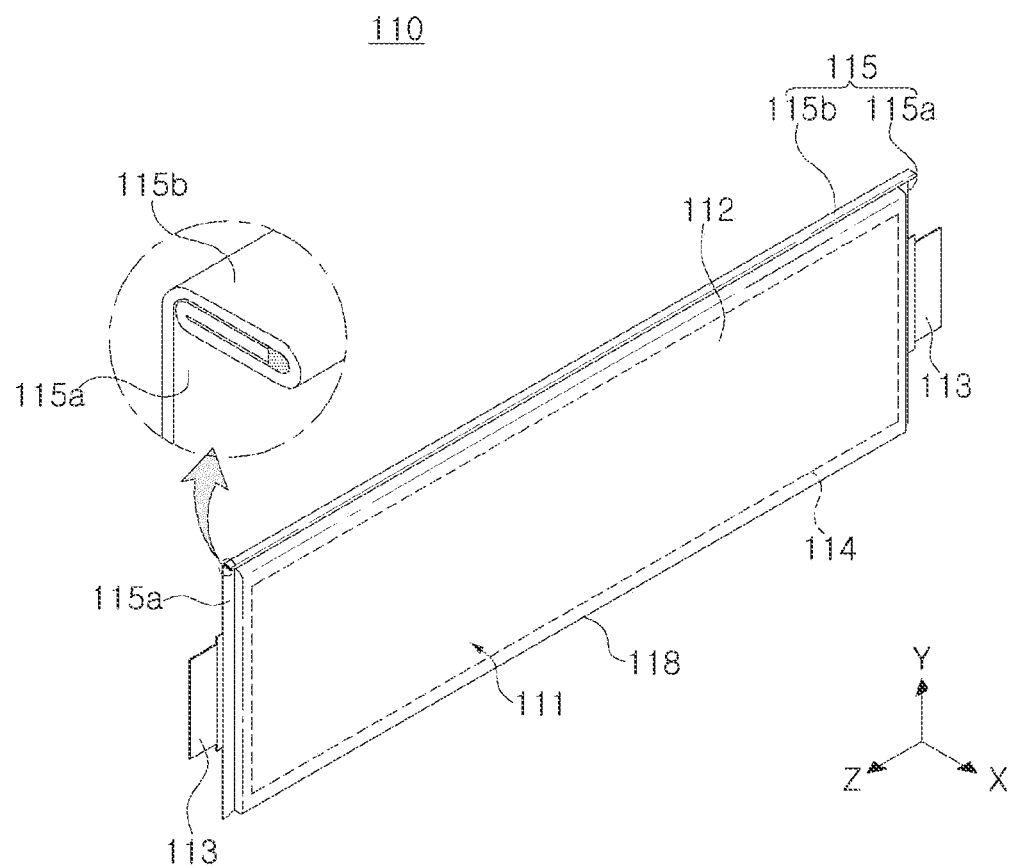
FIG. 4 is a perspective view of a battery cell included in a cell stack based on some embodiments of the disclosed technology.
Figure 5:
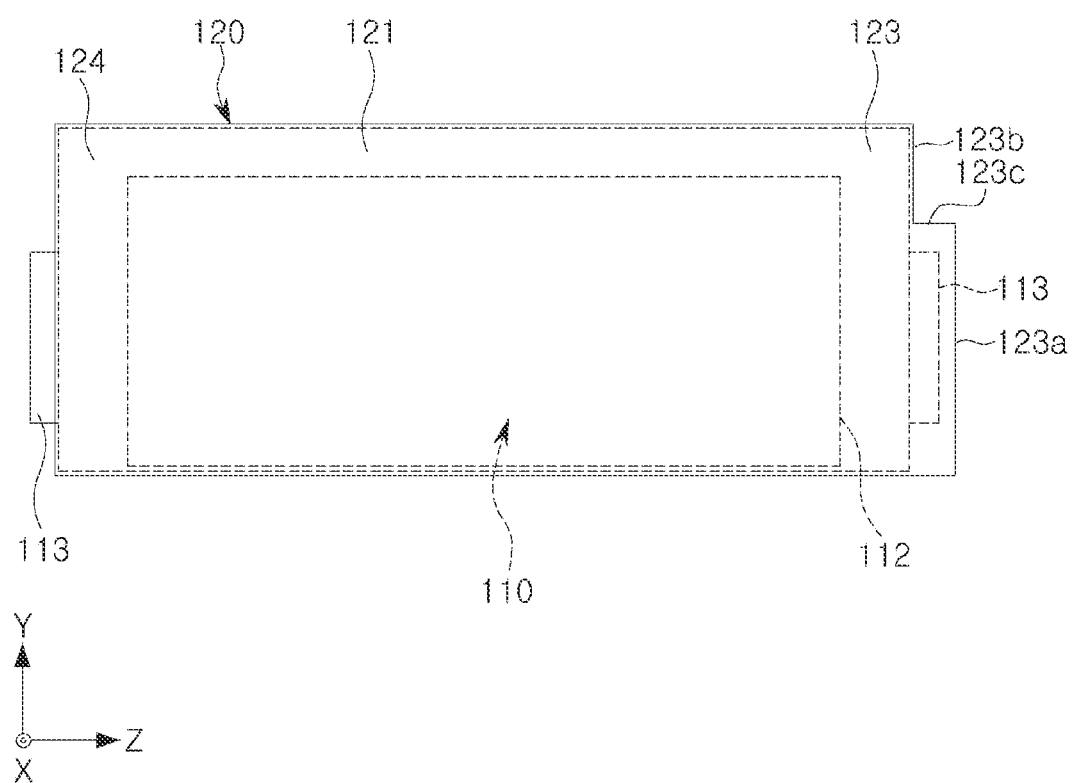
FIG. 5 is a diagram illustrating an arrangement of a thermal blocking member and a battery cell based on some embodiments of the disclosed technology.
Figure 6:
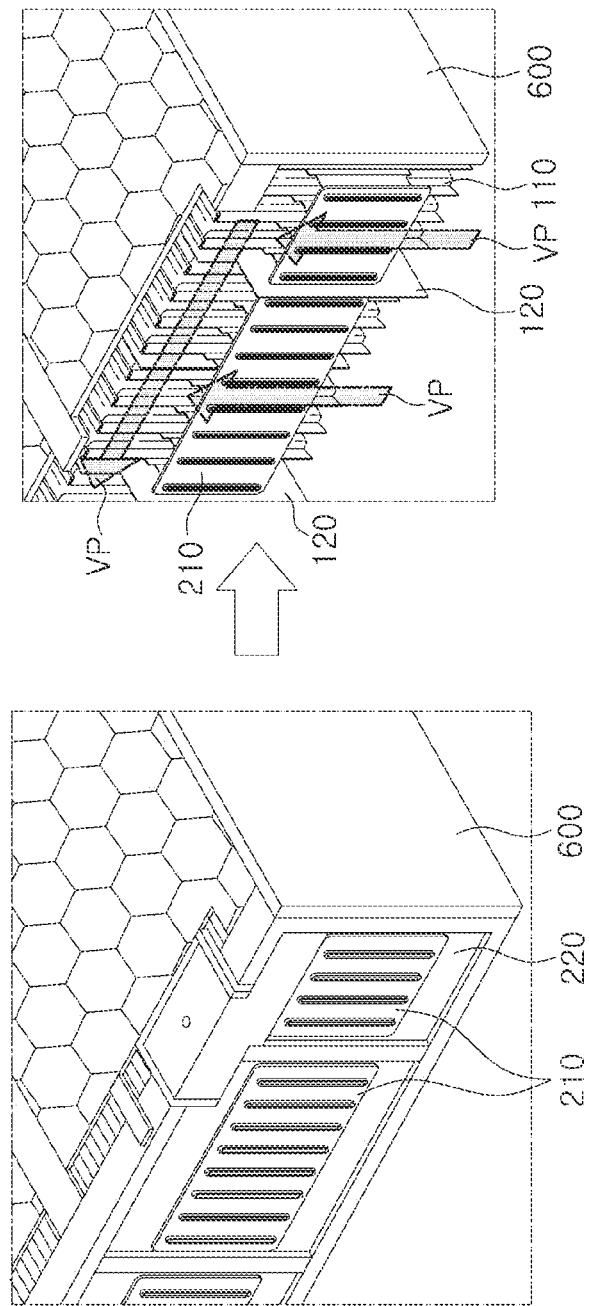
FIG. 6 is a diagram illustrating formation of a venting flow path by a thermal blocking member based on some embodiments of the disclosed technology.
Figure 7:
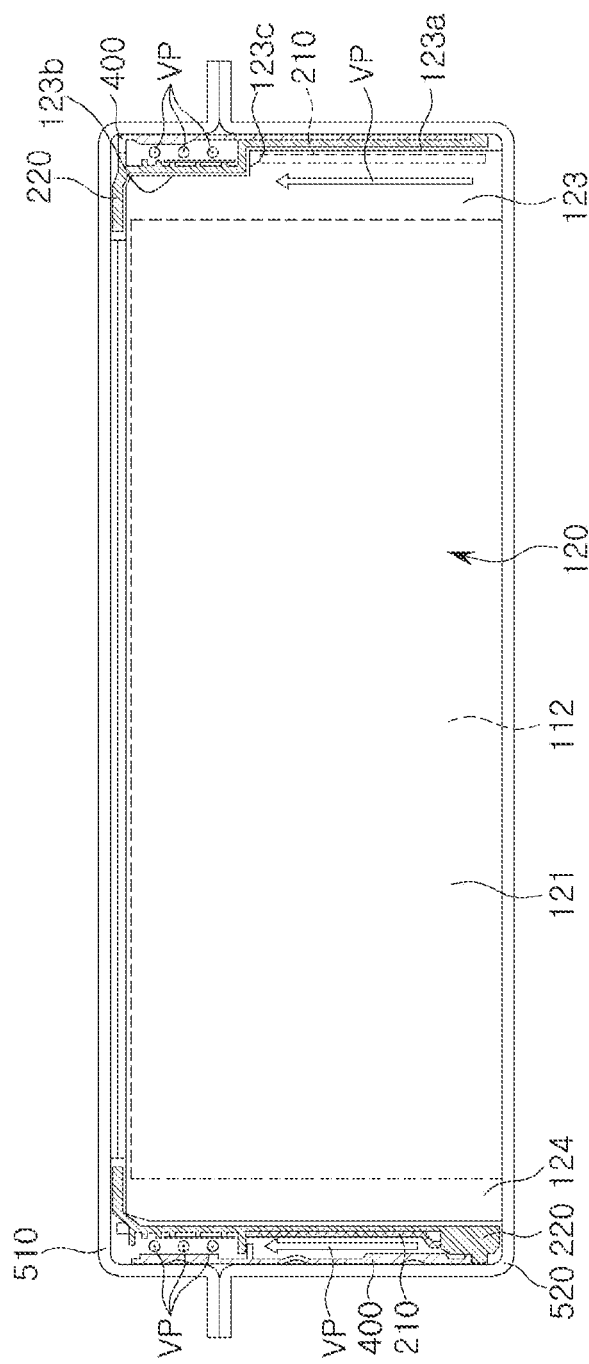
FIG. 7 is a cross-sectional view along line I-I' of FIG. 1.

FIG. 3 illustrates an arrangement of the battery cell 110, the thermal blocking member 120 (e.g., 120a, 120b), and the busbar assembly 200 by way of example. FIG. 4 is a perspective view of the battery cell 110 included in the cell stack 100 based on some embodiments of the disclosed technology. FIG. 5 is a diagram illustrating the arrangement of the thermal blocking member 120 and the battery cell 110 based on some embodiments of the disclosed technology. FIG. 6 is a diagram illustrating formation of a venting flow path VP by the thermal blocking member 120 based on some embodiments of the disclosed technology. FIG. 7 is a cross-sectional view taken along line I-I' of FIG. 1.

In some embodiments of the disclosed technology, the thermal blocking member 120 and the battery module 10 including the thermal blocking member 120 may be implemented as will be discussed below with reference to FIGS. 3 to 7. In some implementations, the thermal blocking member 120 and the battery module 10 including the thermal blocking member 120 illustrated in FIGS. 3 to 7 may correspond to the thermal blocking member 120 and the battery module 10 including the thermal blocking member 120 illustrated in FIGS. 1 to 2.

The cell stack 100 may include a plurality of battery cells 110 and a plurality of thermal blocking members 120 stacked in the first direction (the X-axis direction).

The battery cell 110 may be configured to convert chemical energy into electrical energy to supply power to an external circuit or receive power from the outside, change electrical energy into chemical energy to store electricity. For example, the battery cell 110 may be configured as a nickel metal hydride (Ni-MH) battery or a lithium ion (Li-ion) battery capable of charging and discharging, but is not limited thereto. In some embodiments, a plurality of battery cells 110 may be electrically connected to each other while being stacked side by side.

Referring to FIG. 4, the battery cell 110 may be a pouch-type secondary battery that includes an electrode assembly 114 accommodated in a pouch 111.

In the pouch-type secondary battery, the electrode assembly 114 and an electrolyte (not shown) may be accommodated in the pouch 111 formed by forming one sheet or material layer or a plurality of outer casing materials. For example, the pouch 111 may be formed with one or two receiving portions in a sheet or layer of outer casing material and then folding the outer casing material to form a single space by the receiving portions.

The pouch 111 may include an electrode accommodating portion 112 accommodating the electrode assembly 114 and an electrolyte (not shown), a sealing portion 115 formed in the periphery of the electrode accommodating portion 112, and a lead tab 113 electrically connected to the electrode assembly 114 and exposed to the outside of the pouch 111.

The electrode accommodating portion 112 provides an internal space in which the electrode assembly 114 and an electrolyte (not shown) are accommodated. The electrode assembly 114 may include a plurality of positive electrode plates and a plurality of negative electrode plates stacked with a separator interposed therebetween.

A sealing portion 115 formed by bonding the pouch 111 may be disposed along at least a portion of the circumference of the electrode accommodating portion 112. A thermal fusion method may be used to bond the pouch 111, but is not limited thereto.

The sealing portion 115 may include a first sealing portion 115a formed in a portion in which the lead tab 113 is disposed and a second sealing portion 115b formed in a portion in which the lead tab 113 is not disposed.

In order to increase bonding reliability of the sealing portion 115 and minimize the area of the sealing portion 115, the sealing portion 115 may be folded at least once as shown in the partially enlarged view of FIG. 4.

In the battery cell 110, when one sheet or layer of the outer casing material is folded to have a structure surrounding the electrode assembly 114, there is no need to form a sealing portion in a portion in which the outer casing material is folded. In this case, as shown in FIG. 4, the sealing portion 115 may be formed only on three external surfaces of the electrode accommodating portion 112, and a folding portion 118 may be formed on any one external surface of the electrode accommodating portion 112.

However, the structure of the battery cell 110 is not limited to the above. For example, the electrode accommodating portion 112 may be formed by overlapping two sheets of outer casing materials, and sealing portions may be formed on all four surfaces around the electrode accommodating portion 112.

In addition, the battery cell applied to the battery module based on some example embodiments are not limited to the pouch-type secondary battery described above. For example, the battery cell may be configured as a prismatic can-type secondary battery, or a plurality of pouch-type secondary batteries may be grouped and formed as a bundle.

The cell stack 100 may further include a plurality of thermal blocking members 120 facing the plurality of battery cells 110 in the first direction. Referring to FIG. 3, the plurality of thermal blocking members 120 may be arranged side by side at predetermined intervals in a cell stacking direction (e.g., the X-axis direction of FIG. 3). One or more battery cells 110 may be disposed between two adjacent thermal blocking members 120. In the drawing, four battery cells 110 are stacked between two thermal blocking members 120, but this is only an example, and three or less or five or more battery cells 110 may be disposed between two thermal blocking members 120.

The thermal blocking member 120 may block heat and/or flame propagation between adjacent battery cells 110.

The thermal blocking member 120 may include a material having at least one of flame retardancy, heat resistance, heat insulation, or insulating properties. Here, heat resistance may refer to properties that do not melt and do not change in shape even at a temperature of 300° C. or higher, and heat insulation may refer to properties that have a thermal conductivity of 1.0 W/mK or less. For example, the thermal blocking member 120 may include at least one of mica, silicate, graphite, alumina, ceramic wool, super wool, or aerogel.

However, a material of the thermal blocking member 120 is not limited to the materials described above, and any material may be used as long as it can maintain its shape in a thermal runaway situation of the battery cell 110 and prevent propagation of heat or flames to other adjacent battery cells 110.

In order to maximize energy density of the cell stack 100, a thickness of the thermal blocking member 120 may be less than a thickness of one battery cell 110. Here, the thickness may refer to a length in the cell stacking direction.

In some implementations, the thermal blocking member 120 may include a combination of members having different properties. For example, the thermal blocking member 120 may be configured by combining a material for thermal blocking as described above and a material having a predetermined elastic force.

For example, the thermal blocking member 120 may further include at least one of polyurethane, silicone, or rubber (EPDM), and may press the battery cell 110 using elasticity of these materials.

Referring to FIGS. 3 and 5, the thermal blocking member 120 may include a body portion 121 facing the electrode accommodating portion 112 of the battery cell 110 and blocking portions 123 and 124 extending in the second direction (the Z-axis direction) from both ends of the body portion 121.

FIG. 5 is a view illustrating the thermal blocking member 120 and the battery cell 110 in a stacked state viewed in the cell stacking direction (the X-axis direction).

The body portion 121 of the thermal blocking member 120 faces the electrode accommodating portion 112 in the first direction (the X-axis direction), and may block heat propagation between neighboring battery cells 110.

The blocking portions 123 and 124 of the thermal blocking member 120 may refer to portions extending in the second direction (the Z-axis direction) from both ends of the body portion 121. As the blocking portions 123 and 124 are formed, a length of the thermal blocking member 120 in the second direction (the Z-axis direction) based on some example embodiments may be longer than a length of the electrode accommodating portion 112 in the second direction (the Z-axis direction). For example, the blocking portions 123 and 124 may extend from the end portion of the body portion 121 in the second direction (the Z-axis direction) so that end portions thereof are adjacent to the busbar frame 220.

The blocking portions 123 and 124 may include a first blocking portion 123 at least partially inserted into the busbar frame 220 and a second blocking portion 124 provided on the opposite side of the first blocking portion 123 based on the body portion 121.

A portion of the first blocking portion 123 may be inserted into the busbar frame 220 and protrude further in the second direction (the Z-axis direction) than the busbar 210.

For example, the first blocking portion 123 may have a first end portion 123b facing an inner surface of the busbar frame 220 in the second direction (the Z-axis direction) and a second end portion 123a further protruding in the second direction (the Z-axis direction) than the first end portion and inserted into the busbar frame 220. Due to a positional difference between the first end portion 123b and the second end portion 123a, a step portion 123c may be formed between the first end portion 123b and the second end portion 123a.

The second end portion 123a of the first blocking portion 123 may be inserted into the busbar frame 220. An insertion groove 222 into which the second end portion 123a is inserted may be disposed in the busbar frame 220. In addition, a slit opening 221 into which the lead tab 113 of the battery cell 110 is inserted may be disposed in the busbar frame 220.

In a case where the second end portion 123a of the first blocking portion 123 is inserted into the busbar frame 220, the second end portion 123a of the first blocking portion 123 may protrude further in the second direction (the Z-axis direction) than the busbar 210. That is, a distance between a side surface of the housing 500 and the second end portion 123a in the second direction (the Z-axis direction) may be less than a distance between the side surface of the housing 500 and the busbar 210 in the second direction (the Z-axis direction).

A region having the second end portion 123a in the first blocking portion 123 may be inserted into the busbar frame 220 and disposed between two adjacent busbars 210. Accordingly, the first blocking portion 123 may prevent physical contact between the two busbars 210.

In some implementations, since the second end portion 123a of the first blocking portion 123 is configured to protrude further in the second direction (the Z-axis direction) than the busbar 210, the occurrence of an unexpected short circuit between the busbars 210 in a thermal runaway situation may be physically prevented.

When the first blocking portion 123 is formed on one side of the body portion 121, the second blocking portion 124 may be formed on the other side opposite to one side of the body portion 121. Unlike the first blocking portion 123, the second blocking portion 124 may not have a portion inserted into the busbar frame 220. However, in some implementations, a portion of the second blocking portion 124 may be inserted into the busbar frame 220.

An end portion of the second blocking portion 124 may be disposed to face an inner surface of the busbar frame 220 so as not to interfere with the busbar 210.

In the plurality of blocking portions 123 and 124, the first blocking portion 123 of one of the thermal blocking members 120 is inserted into the first busbar frame 220, and the first blocking portion 123 of the other of the thermal blocking members 120 may be inserted into the second busbar frame 220. For example, referring to FIG. 3, a pair of busbar frames 220 may include a first busbar frame 220a and a second busbar frame 220b spaced apart from each other in the second direction (the Z-axis direction), and the plurality of thermal blocking members 120 may include a first thermal blocking member 120a in which the first blocking portion 123 is inserted into the first busbar frame 220a and a second thermal blocking member 120b in which the first blocking portion 123 is inserted into the second busbar frame 220b.

In order to avoid interference with the busbar 210, the first thermal blocking member 120a and the second thermal blocking member 120b may be alternately disposed in the first direction (the X-axis direction).

The first blocking portion 123 and the second blocking portion 124 may serve to block gas or flames occurring in a thermal runaway situation from flowing in the first direction (the X-axis direction) in the vicinity of the cell stack. Since the flow of gas or flames in the first direction (the X-axis direction) is blocked by the first blocking portion 123 and the second blocking portion 124, the gas or flames may be naturally guided to flow in a direction (for example, a third direction (a Y-axis direction) in which the upper case portion and the lower case portion face each other) perpendicular to the first direction (the X-axis direction).

In this manner, the battery module 10 based on some example embodiments includes the thermal blocking member 120 having the blocking portions 123 and 124, so that undesirable flow of high-temperature gas or flames in the vicinity of the cell stack 100 may be suppressed in a thermal runaway situation.

In particular, the thermal blocking member 120 based on some example embodiments extends in length to the busbar frame 220 to block undesirable flow of high-temperature gas or flames between the busbar frame 220 and the cell stack 100 and guide a flow path thereof in a certain direction.

FIGS. 6 and 7 illustrate a flow path of gas and/or flames described above. Referring to FIGS. 6 and 7, the venting flow path VP through which gas or flames flow may have a specific position or path that is determined by the blocking portions 123 and 124 of the thermal blocking member 120.

Since the blocking portions 123 and 124 of the thermal blocking member 120 have properties, such as flame retardancy, heat resistance, and heat insulation, the blocking portions 123 and 124 may maintain shapes thereof even in high-temperature environments. In a thermal runaway situation, gas or flames occurring in the cell stack 100 may be blocked by the blocking portions 123 and 124 of the thermal blocking member 120 and flow along surfaces of the blocking portions 123 and 124.

For example, since the blocking portions 123 and 124 extend to be adjacent to an inner surface of the busbar frame 220, the venting flow path VP may be formed to connect to the outside the busbar frame 220 by the blocking portions 123 and 124. Therefore, as shown in FIG. 7, some of the venting flow paths VP may be formed in a space between the external surface of the busbar frame 220 and the housing 500.

Alternatively, as shown in FIG. 7, the venting flow path VP formed inside the busbar frame 220 may be blocked in a flow in the first direction (the X-axis direction) by the blocking portions 123 and 124 and may be formed in a direction (the Y-axis direction) toward an upper side of the battery module 10. That is, the blocking portions 123 and 124 extending in the second direction (the Z-axis direction) from the body portion 121 blocks the flow of gas or flames in the first direction (the X-axis direction) perpendicular to the second direction (the Z-axis direction) and allows gas or flames to flow in the third direction (the Y-axis direction).

In particular, as gas or flames continuously occur, the thermal blocking member 120 may guide a flow of gas or flames toward the upper side of the battery module 10.

In this manner, the thermal blocking member 120 may prevent gas or flames from spreading in the cell stacking direction in the vicinity of the cell stack 100, thereby preventing the battery cells 110 from being sequentially ignited by gas or flames.

The busbar frame 220 may be formed of a material relatively vulnerable to high temperatures than the thermal blocking member 120. For example, when the busbar frame 220 includes a plastic material, the busbar frame 220 may be structurally collapsed by high-temperature gas or flames occurring in a thermal runaway situation. In this case, there is a risk that gas or flames may spread through an empty space formed as the busbar frame 220 collapses. In this situation, the thermal blocking member 120 may guide a flow path of gas or flames to a safe path.

For example, the inset on the left in FIG. 6 illustrates an example of the busbar frame 220 before a thermal runaway situation occurs, and the inset on the right in FIG. 6 illustrates an example of the busbar frame 220 that has been melted in the thermal runaway situation.

Referring to FIG. 6, when the busbar frame 220 is melted by high-temperature gas or flames, the venting flow path VP may be formed through a space occupied by the busbar frame 220.

In this situation, the thermal blocking member 120 may block an electrical short circuit between the busbars 210 caused by flowing gas or flames.

For example, as shown in FIG. 6, some venting flow paths VP may be formed to face in the third direction (the Y-axis direction) along the thermal blocking member 120, and some other venting flow paths VP may be formed to face in the first direction (the X-axis direction) along the empty space in which the busbar frame 220 has been melted (e.g., a passage surrounded by the first end portion 123b of the thermal blocking member 120, the step portion 123c, and the housing 500).

The gas or flames guided to flow upwardly by the thermal blocking member 120 avoids the busbar 210 along the venting flow path VP facing in the first direction (the X-axis direction) to flow either in a forward direction or a backward direction of the battery module 10. Accordingly, an electrical short circuit that may be caused by gas, flames, and combustion scattering products between two adjacent busbars 210 may be prevented.

In some implementations, when the venting hole 530 is formed in the upper case portion 510, gas or flames flowing along the venting flow path VP may be safely discharged to the outside through the venting hole 530.

In this case, to facilitate discharge, the venting flow path VP may be formed to flow along a lower portion of the venting hole 530. For example, the step portion 123c of the thermal blocking member 120 may be formed to overlap the venting hole 530 in the third direction (the Y-axis direction), so that the venting flow path VP may be guided to be formed below the venting hole 530.

In some example embodiments, the battery module may further include an auxiliary thermal blocking member to more effectively protect the battery cell 110 from high-temperature gas or flames in a thermal runaway situation. Hereinafter, a battery module based on some example embodiments will be described with reference to FIGS. 8 to 11.

Figure 8:
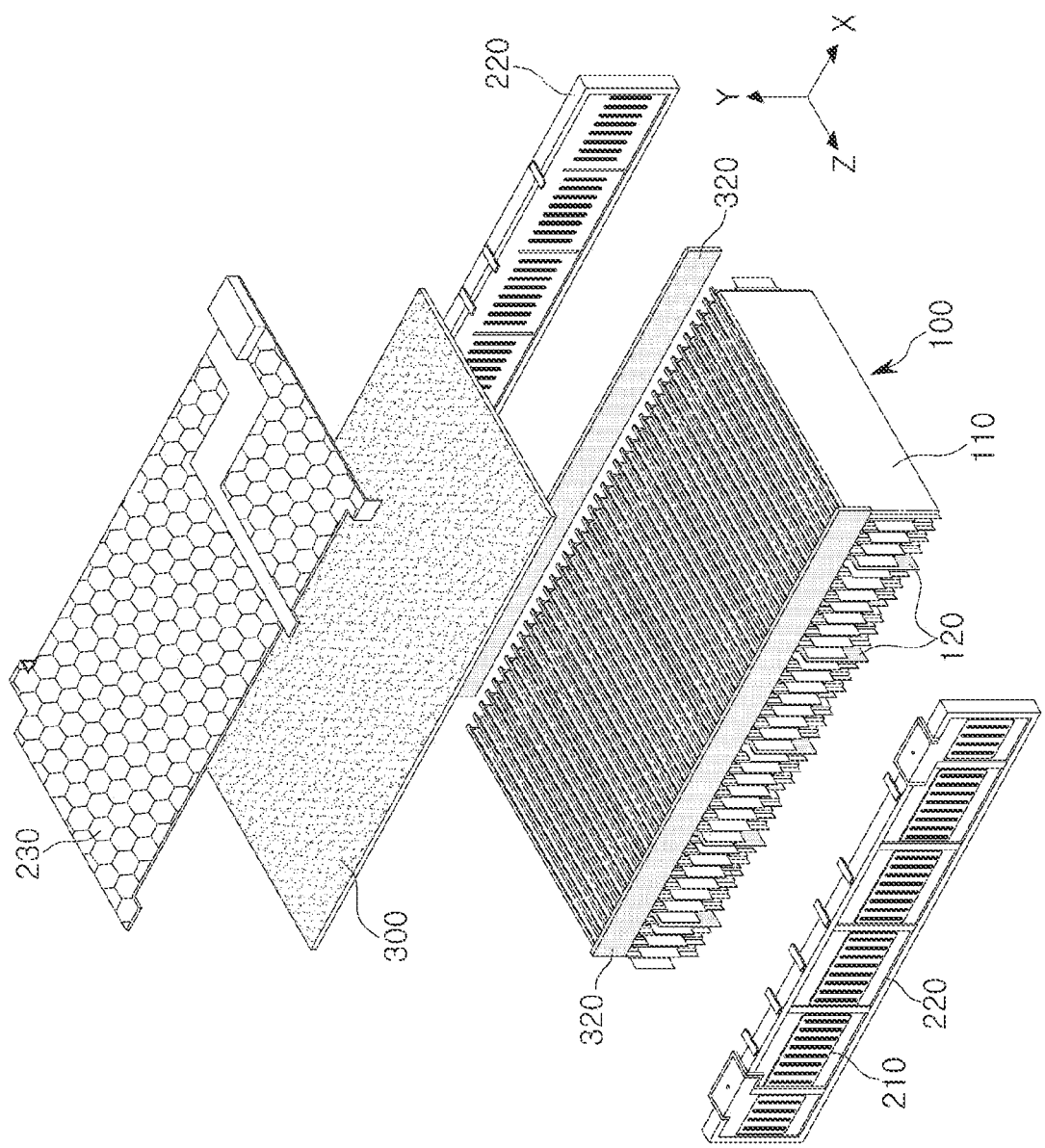
FIG. 8 is a partially exploded perspective view of a battery module based on some embodiments of the disclosed technology.
Figure 9:
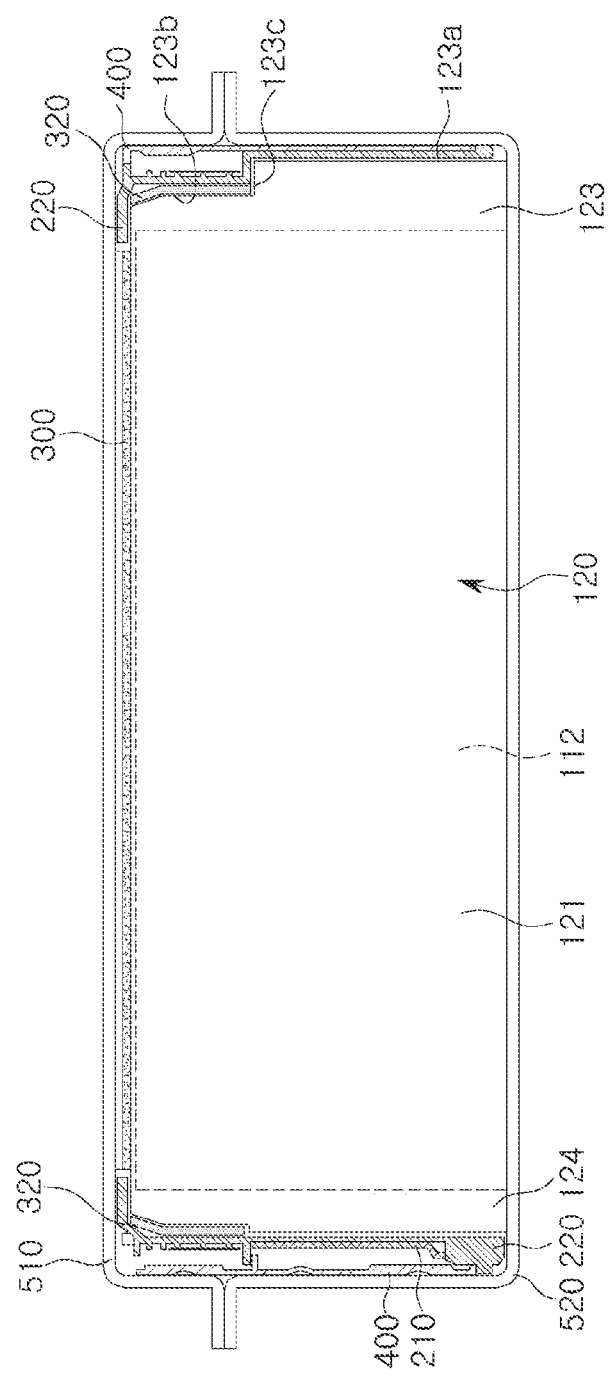
FIG. 9 is a cross-sectional view of a battery module based on some embodiments of the disclosed technology.

FIG. 8 is a partially exploded perspective view of a battery module based on some embodiments of the disclosed technology. FIG. 9 is a cross-sectional view of a battery module based on some embodiments of the disclosed technology.

As described above with reference to FIGS. 6 and 7, the thermal blocking member 120 included in the cell stack 100 may guide a flow path of a high-temperature gas or flames to be formed in a predetermined position (e.g., near an upper corner inside the battery module 10).

In this case, in order to further reduce the effect of high-temperature gas or flames on the cell stack 100, the battery module may further include a third thermal blocking member 320 disposed on one side of the cell stack 100.

In some implementations, the term "thermal blocking member 120" may be used to indicate a thermal blocking member 120 disposed between the battery cells 110. In addition, in some implementations, different from the thermal blocking member 120 disposed between the battery cells 110, the third thermal blocking member 320 may also be referred to as "auxiliary thermal blocking member." In addition, in some implementations, the upper thermal blocking member 300 described above may correspond to a fourth thermal blocking member 300.

In addition, in some implementations, components (e.g., the cell stack 100, the busbar 210, the busbar frame 220, the thermal blocking members 120, etc.) in the battery module of FIGS. 8 and 9, other than the auxiliary thermal blocking member 320, correspond to the components of the battery module 10 of FIGS. 1 to 7.

The auxiliary thermal blocking member 320 may be disposed in a position different from that of the upper thermal blocking member 300. For example, the upper thermal blocking member 300 may be disposed to face the cell stack 100 in the third direction (the Y-axis direction), and the auxiliary thermal blocking member 320 may be disposed to face the cell stack 100 in the second direction (the Z-axis direction).

The auxiliary thermal blocking member 320 may be disposed in a position in which the auxiliary thermal blocking member 320 is not interfered with the thermal blocking member 120. For example, the auxiliary thermal blocking member 320 may be disposed to extend in the first direction (the X-axis direction) between the first end portion 123b of the thermal blocking member 120 and the busbar frame 220. In this case, the auxiliary thermal blocking member 320 may face the step portion 123c of the thermal blocking member 120 in the third direction (the Y-axis direction).

Materials of the upper thermal blocking member 300 and the auxiliary thermal blocking member 320 may be the same as those of the thermal blocking member 120 described above with reference to FIGS. 1 to 7. That is, the upper thermal blocking member 300 and the auxiliary thermal blocking member 320 may be configured to have at least one or more properties of flame retardancy, heat resistance, heat insulation, and insulating properties, so that the battery cells 110 may be protected in a thermal runaway situation. For example, the upper thermal blocking member 300 and the auxiliary thermal blocking member 320 may include at least one of mica, silicate, graphite, alumina, ceramic wool or super wool, or aerogel.

The venting flow path VP may be formed outside the auxiliary thermal blocking member 320. For example, the venting flow path VP may be formed in a space between the auxiliary thermal blocking member 320 and the upper case portion 510. The auxiliary thermal blocking member 320 may block high-temperature gas or flames flowing through the venting flow path VP from directly contacting the cell stack 100, thereby preventing the battery cells 110 from being sequentially ignited by gas or flames.

Since the auxiliary thermal blocking member 320 extends in the first direction (the X-axis direction) from the side surface of the cell stack 100, the side surface of the cell stack 100 may be effectively protected from gas or flames flowing in the first direction (the X-axis direction) along a space in which the busbar frame 220 collapses.

In particular, as described above with reference to FIGS. 6 and 7, when the venting flow path VP is formed at the upper corner of the battery module 10, the auxiliary thermal blocking member 320 disposed between the cell stack 100 and the venting flow path VP may protect the battery cells 110 from high-temperature gas or flames flowing through the venting flow path VP.

Inn another example embodiment, the auxiliary thermal blocking member may be integrally formed with the upper thermal blocking member 300. For example, FIGS. 10 and 11 illustrate a state in which the auxiliary thermal blocking member 310 and the upper thermal blocking member 300 are integrally formed.

Figure 10:
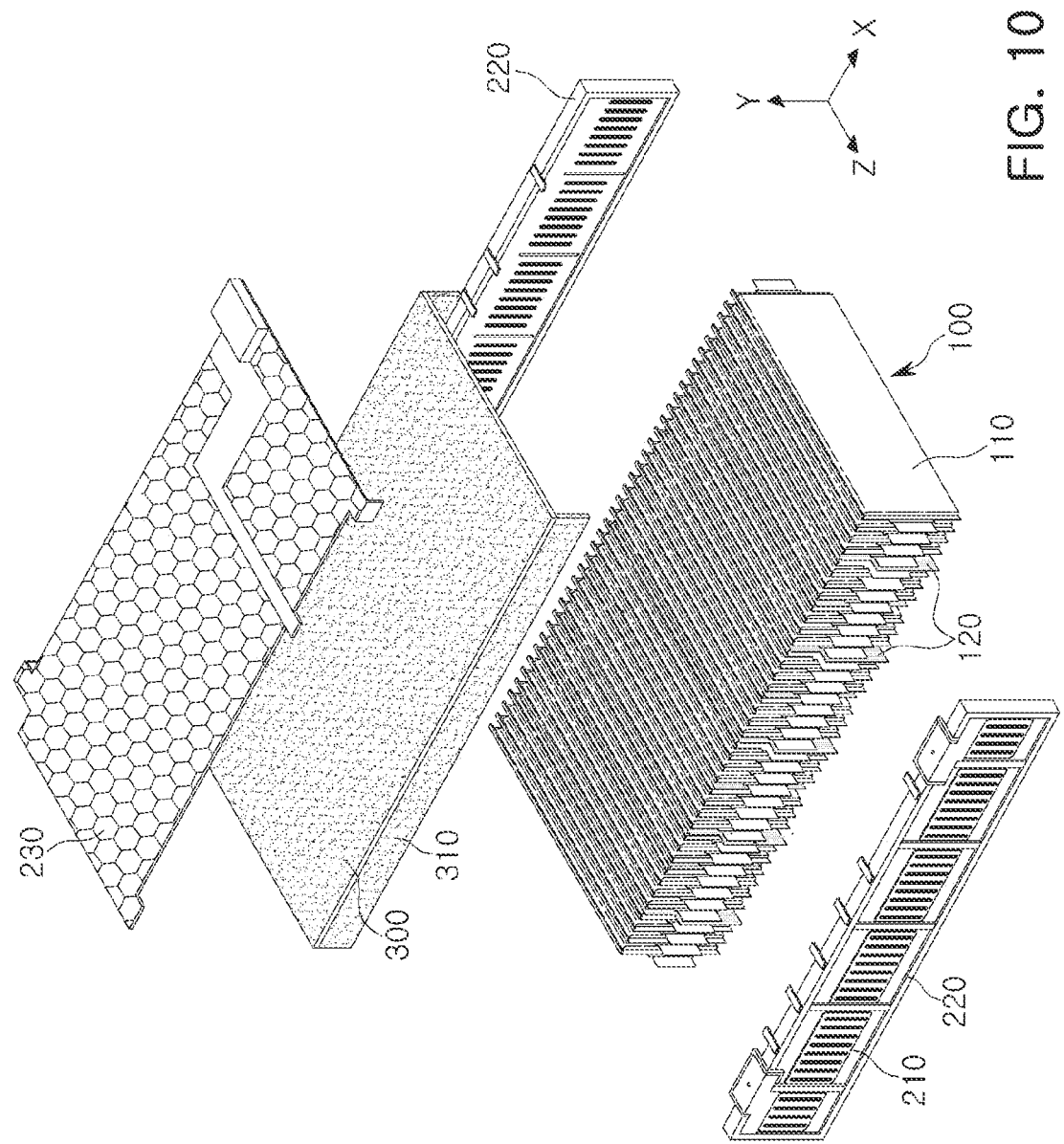
FIG. 10 is a partially exploded perspective view of a battery module based on some embodiments of the disclosed technology.

FIG. 10 is a partially exploded perspective view of a battery module based on some embodiments of the disclosed technology. FIG. 11 is a cross-sectional view of a battery module based on some embodiments of the disclosed technology.

Figure 11:
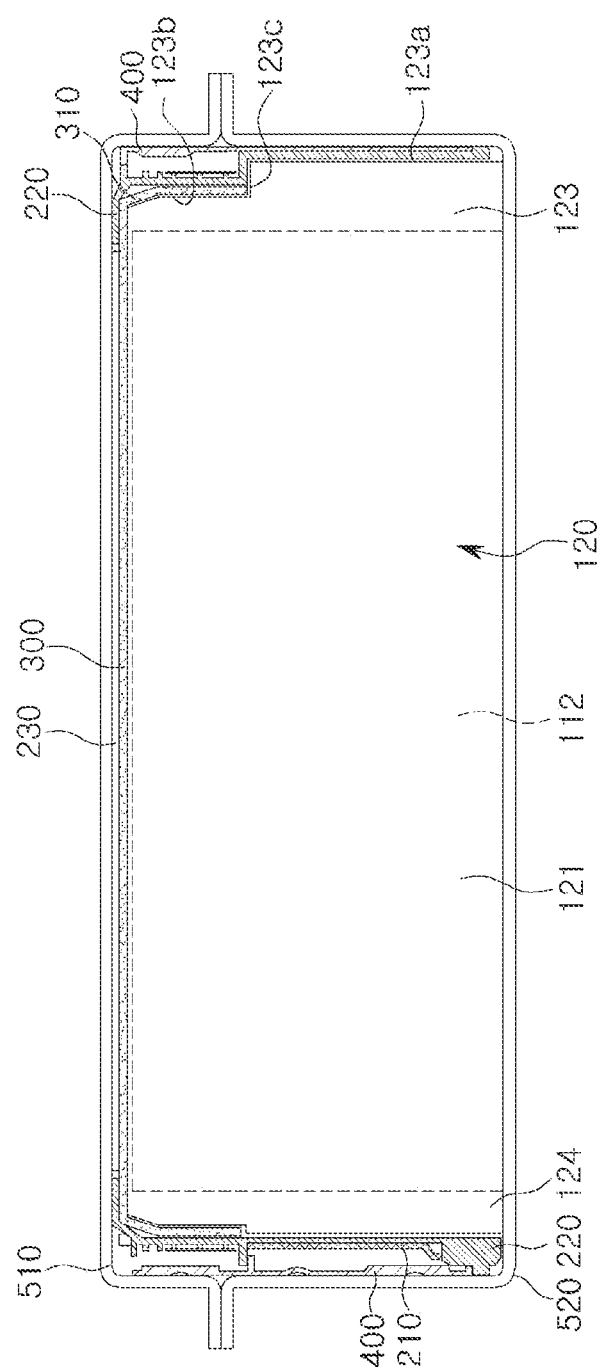
FIG. 11 is a cross-sectional view of a battery module based on some embodiments of the disclosed technology.

In the battery module described in FIGS. 10 and 11, characteristics other than that the auxiliary thermal blocking member 310 and the upper thermal blocking member 300 are integrally formed are the same as those of the battery module described above with reference to FIGS. 8 and 9 above. Accordingly, redundant descriptions of FIGS. 8 and 9 may be omitted.

The upper thermal blocking member 300 and the auxiliary thermal blocking member 310 may be connected to each other. For example, when the upper thermal blocking member 300 faces the cell stack 100 in the third direction (the Y-axis direction), the auxiliary thermal blocking member 310 may be connected to both end portions of the upper thermal blocking member 300 in the second direction (the Z-axis direction) to cover a portion of the surface of the cell stack 100.

As the upper thermal blocking member 300 and the auxiliary thermal blocking member 310 are integrally formed with each other, the position of the auxiliary thermal blocking member 310 may be more stably maintained in a thermal runaway situation, and thus, the battery cells 110 may be more effectively protected.

In some example embodiments, the battery module 10 may suppress propagation of flames or gas between neighboring battery cells 110 through the thermal blocking member 120 disposed between the battery cells 110.

In addition, since at least a portion of the thermal blocking member 120 is inserted into the busbar frame 220, a short circuit between two adjacent busbars 210 may be prevented in a thermal runaway situation.

In addition, since the thermal blocking member 120 includes the blocking portions 123 and 124 extending toward the busbar 210 assembly, a flow of high-temperature gas or flames in the vicinity of the cell stack 100 may be prevented in a thermal runaway situation.

In addition, since the blocking portions 123 and 124 of the thermal blocking member 120 block the flow of high-temperature gas or flames in the cell stacking direction in the vicinity of the cell stack 100 in a thermal runaway situation and guide gas or flames to flow in an upward direction of the battery module 10, gas or flames may be guided to be safely discharged to the outside.

In addition, since the battery module 10 further includes the auxiliary thermal blocking members 310 and 320 protecting the side surface of the cell stack 100 and the upper thermal blocking member 300 disposed above the cell stack 100, a sequential ignition of the battery cells 110 by gas or flames may be prevented.

In some example embodiments, the battery module capable of guiding a flow path of high-temperature gas or flames occurring in a battery cell to a predetermined path may be implemented.

In addition, the battery module capable of blocking heat propagation between neighboring battery cells and blocking indiscriminate flow of high-temperature gas or flames in the vicinity of a cell stack may be implemented.

In addition, the battery module capable of preventing an electrical short circuit from occurring between busbars in a thermal runaway situation may be provided.

The disclosed technology can be implemented in rechargeable secondary batteries that are widely used in battery-powered devices or systems, including, e.g., digital cameras, mobile phones, notebook computers, hybrid vehicles, electric vehicles, uninterruptible power supplies, battery storage power stations, and others including battery power storage for solar panels, wind power generators and other green tech power generators. Specifically, the disclosed technology can be implemented in some embodiments to provide improved electrochemical devices such as a battery used in various power sources and power supplies, thereby mitigating climate changes in connection with uses of power sources and power supplies. Lithium secondary batteries based on the disclosed technology can be used to address various adverse effects such as air pollution and greenhouse emissions by powering electric vehicles (EVs) as alternatives to vehicles using fossil fuel-based engines and by providing battery-based energy storage systems (ESSs) to store renewable energy such as solar power and wind power.

Only specific examples of implementations of certain embodiments of the disclosed technology are described. Variations, improvements and enhancements of the disclosed embodiments and other embodiments may be made based on the disclosure of this patent document.

What is claimed is:

1. A battery module comprising:
a housing including an internal space and a venting hole to allow gas to be discharged from the internal space;
a cell stack accommodated in the internal space and including a plurality of battery cells and a plurality of thermal blocking members that are stacked, wherein each of the plurality of the thermal blocking members is disposed between the plurality of battery cells;
a plurality of electrically conductive members electrically connected to the plurality of battery cells; and
a frame coupled to and structured to support the plurality of electrically conductive members and facing the plurality of battery cells,
wherein each of the plurality of battery cells includes an electrode assembly and an electrode accommodating portion accommodating the electrode assembly,
wherein at least one of the plurality of thermal blocking members disposed adjacent to one battery cell of the plurality of battery cells includes:
a body portion facing the electrode accommodating portion of the one battery cell; and
blocking portions extending from the body portion and disposed to at least partially block a gas flow,
wherein the blocking portions include a first blocking portion disposed on one side of the body portion,
wherein the first blocking portion includes:
a first end portion facing an inner surface of the frame;
a second end portion protruding further than the first end portion; and
a step portion connecting the first end portion to the second end portion,
wherein the step portion is disposed to overlap the venting hole.

2. The battery module of claim 1, wherein the blocking portion includes an end portion that is adjacent to the frame.

3. The battery module of claim 1, wherein the plurality of thermal blocking members includes a material that includes at least one of mica, ceramic wool, or aerogel.

4. The battery module of claim 1, wherein the blocking portions further include:
a second blocking portion disposed on another side opposite to the one side of the body portion,
wherein the plurality of battery cells are stacked in a first direction.

5. The battery module of claim 4, wherein the first blocking portion is disposed between the plurality of electrically conductive members in the first direction.

6. The battery module of claim 4, wherein
the second end portion protrudes further in the second direction perpendicular to the first direction than the plurality of electrically conductive members.

7. The battery module of claim 6, wherein the frame includes an insertion recess into which the second end portion of the blocking portion is inserted.

8. The battery module of claim 6, wherein
the housing includes an upper case portion and a lower case portion configured to cover upper and lower portions of the cell stack, respectively,
wherein the venting hole is disposed on the upper case.

9. The battery module of claim 8, further comprising a venting flow path formed in a space between the first end portion and the upper case portion.

10. The battery module of claim 4, wherein the frame includes:
a first frame disposed on one side of the cell stack;
a second frame disposed on another side opposite to the one side of the cell stack; and
a connection frame connecting the first frame to the second frame.

11. The battery module of claim 10, wherein the plurality of thermal blocking members include:
a first thermal blocking member in which the first blocking portion is inserted into the first frame; and
a second thermal blocking member in which the first blocking portion is inserted into the second frame.

12. The battery module of claim 11, wherein the first thermal blocking member and the second thermal blocking member are alternately disposed in the first direction.

13. The battery module of claim 11, wherein an end portion of the second blocking portion of the first thermal blocking member is adjacent to the second frame.

14. The battery module of claim 6, further comprising:
a third thermal blocking member disposed between the frame and the first end portion and extending in the first direction.

15. The battery module of claim 14, further comprising:
a fourth thermal blocking member facing the cell stack in a third direction perpendicular to both the first and second directions.

16. The battery module of claim 15, wherein the third thermal blocking member and the fourth thermal blocking member are integrally formed.

17. The battery module of claim 1,
wherein the plurality of battery cells are stacked in a first direction,
wherein the first end portion and the second end portion are extending toward a second direction perpendicular to the first direction, and
wherein the first end portion and the second end portion are disposed along a third direction perpendicular both to the first direction and the second direction, and
wherein the step portion is disposed between the first end portion and the second end portion in the second direction.

18. The battery module of claim 17,
wherein the first end portion and the step portion form a first venting flow path through which the gas flows in the first direction.

19. The battery module of claim 17,
wherein the second end portion is configured to block the gas flow in the first direction and forms a second venting flow path through which the gas flows towards the first venting flow path.

20. The battery module of claim 1,
wherein the plurality of battery cells are stacked in a first direction, and the second end portion protrudes in a second direction perpendicular to the first direction, and
wherein the step portion and the venting hole are disposed to overlap each other in a third direction perpendicular to both the first direction and the second direction.

* * * * *